(12) United States Patent
Wang

(10) Patent No.: US 7,036,996 B1
(45) Date of Patent: May 2, 2006

(54) OPTICAL FIBER COUPLING ASSEMBLY

(76) Inventor: Chong-Nien Wang, 3F, No. 12, Lane 13, Chi Hsiang St., Hsin Tien City, Taipei Hsien (TW)

( * ) Notice: Subject to any disclaimer, the term of this patent is extended or adjusted under 35 U.S.C. 154(b) by 0 days.

(21) Appl. No.: 11/135,423

(22) Filed: May 24, 2005

(51) Int. Cl.
*G02B 6/38* (2006.01)

(52) U.S. Cl. .......................... 385/55; 385/58; 385/69; 385/71; 385/86

(58) Field of Classification Search .................. None
See application file for complete search history.

(56) References Cited

U.S. PATENT DOCUMENTS 5,359,688 A * 10/1994 Underwood ................. 385/70
5,719,977 A * 2/1998 Lampert et al. ............... 385/60
6,302,594 B1 * 10/2001 Lee ............................ 385/87

\* cited by examiner

*Primary Examiner*—Juliana Kang
(74) *Attorney, Agent, or Firm*—Leong C. Lei

(57) ABSTRACT

An optical fiber coupling assembly is provided, which is an integration of connectors and coupler. A connector is installed to an end of a fiber cable. The connector is then inserted into a sleeve of a coupler. A latch is used to force the end surface of the fiber cable's core to be tightly joined to that of an opposite fiber cable also coupled to the coupling assembly, reducing the power loss of the light signal transmission over the two fiber cables. The coupling assembly is structurally simple, has a smaller form factor, and is able to increase operation efficiency and reduce production cost.

2 Claims, 5 Drawing Sheets

OPTICAL FIBER COUPLING ASSEMBLY

BACKGROUND OF THE INVENTION (a) Technical Field of the Invention

The present invention generally relates to optical fibers, and more particularly to a coupling assembly comprising coupler and connectors for tight joining of two fiber cables' end surfaces.

(b) Description of the Prior Art

The introduction of fiber optics has dramatically changed how communications is actually conducted. Using lights as carriers and fiber cables to deliver fight signals precisely and accurately, fiber optics provides signal transmissions far superior than conventional means and, therefore, relevant industries have emerged around the field of fiber optics.

In real-life applications, it is often required to join two segments of fiber cables together using passive devices such as couplers. An ideal fiber coupler should be able to provide low power loss, reliability in terms of frequent connection and disconnection, durability under harsh environment, and easy operation. Currently, a common fiber coupler establishes physical contact between two fiber cables by inserting the connectors installed at the ends of the fiber cables into the sleeves inside the coupler. A spring or other similar devices inside the coupler exerts pressure on the connectors or a tenon of the coupler so that the end surfaces of the fiber cables' cores are in close contact with each other, and light signals could thereby be transmitted from one segment of the fiber cables to another.

For example, both the U.S. Pat. No. 5,359,688 and Republic of China Patent No. 302,441 disclose different connector and coupler designs for joining a single pair of fiber cables. The connectors according to these teachings are composed of multiple components arranged in a complicated structure. Not only the installation of the connectors becomes burdensome, but also the coupler requires a larger form factor so as to accommodate the more complicated connectors. In user environments where facility space is tight, the bulky couplers could only provide a limited number of cable couplings.

U.S. Pat. No. 5,719,977 therefore discloses a connector design having a smaller form factor, which is locked to the coupler utilizing the connector's special shape. Compared with conventional connectors and couplers, the design is able to provide an additional pair of fiber cable coupling within the same amount of space. The space saving of the teaching, however, is compromised by the additional requirement of increased precision in the production of the reduced-size components. For example, the diameter of the connector's tubular plug is reduced from the conventional 2.5 mm to 1.25 mm, making the manufacturing process much more difficult and, therefore, increasing the production cost dramatically.

Accordingly, an improved design is required so as to strike a balance between the requirements for scaling down the component sizes and for reducing operation difficulty and production cost.

SUMMARY OF THE INVENTION

The primary purpose of the present invention is to provide an assembly for fiber cable coupling, which utilizes structurally simple and easy to assembly connectors and coupler so as to reduce the production cost of the connectors and the coupler and to increase the operation efficiency.

To achieve the foregoing purpose, the coupling assembly provided by the present invention is composed of structurally simple connectors and coupler. A crimp ring and the connector body are fixedly installed on an end of a fiber cable. A tubular plug of the connector body is fit inside a sleeve of the coupler. A spring driven latch exerts pressure on the connector body so that the end surface of the fiber core of a fiber cable would be tightly joined to that of an opposite fiber cable also coupled to the coupling assembly, providing effective fight signal transmission over the two fiber cables. The coupling assembly of the present invention is able to provide an additional coupling of another pair of fiber cables within the same form factor as conventional couplers. Due to its simplicity, the coupling assembly of the present invention could further reduce production cost and increase operation efficiency.

The foregoing object and summary provide only a brief introduction to the present invention. To fully appreciate these and other objects of the present invention as well as the invention itself, all of which will become apparent to those skilled in the art the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

The following descriptions are of exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1:
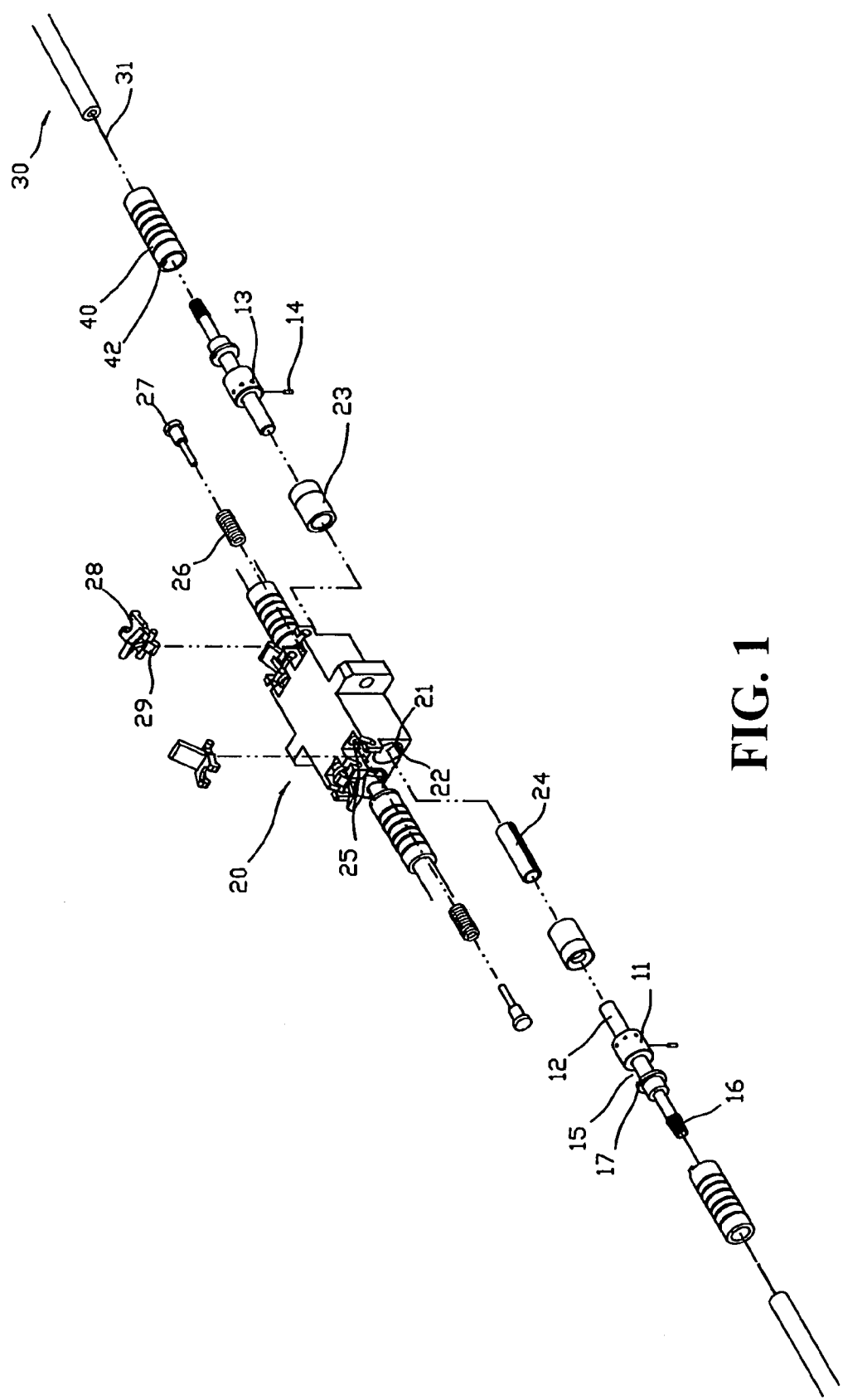
FIG. 1 is a perspective explosion view showing the coupling assembly according to an embodiment of the present invention.
Figure 2:
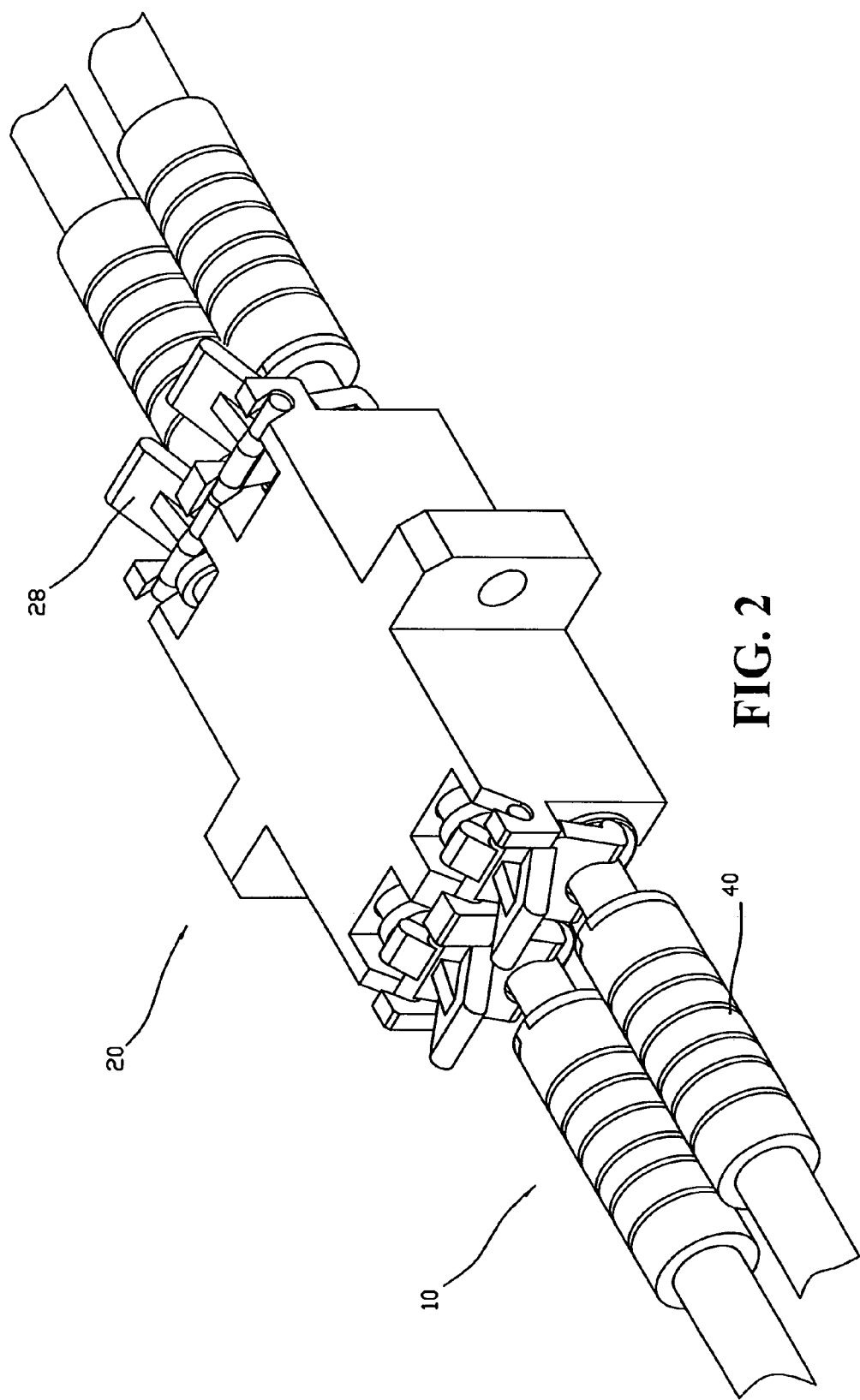
FIG. 2 is a perspective view showing a number of fiber cables coupled by the coupling assembly of FIG. 1.
Figure 3:
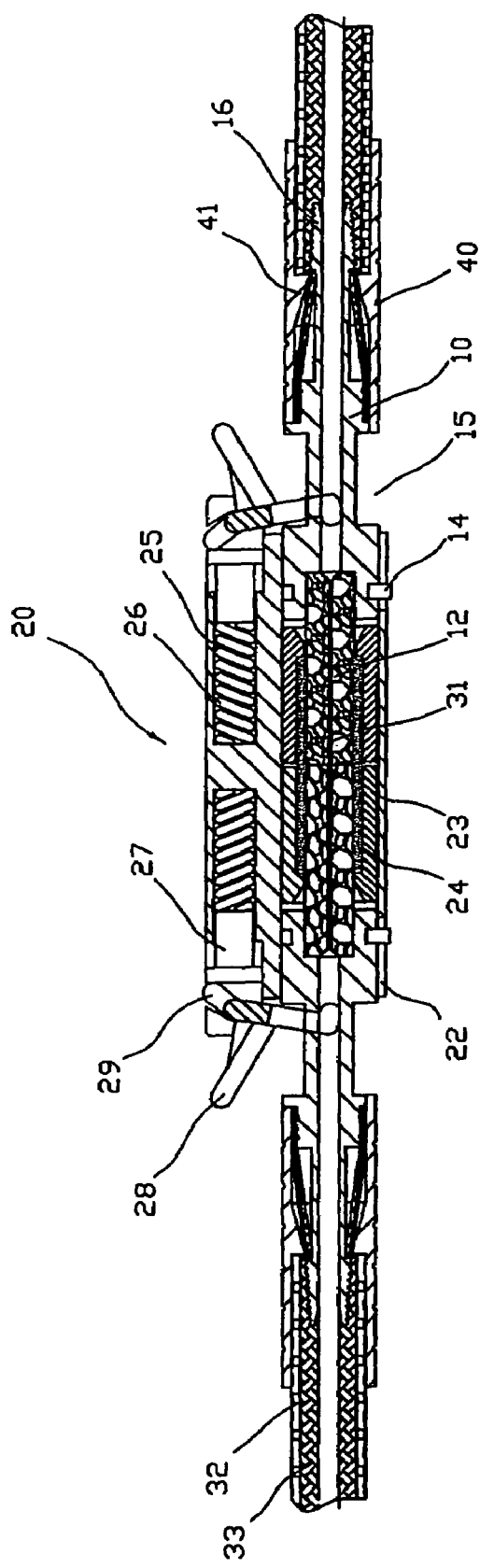
FIG. 3 is a sectional view of the coupling assembly of FIG. 1.
Figure 4:
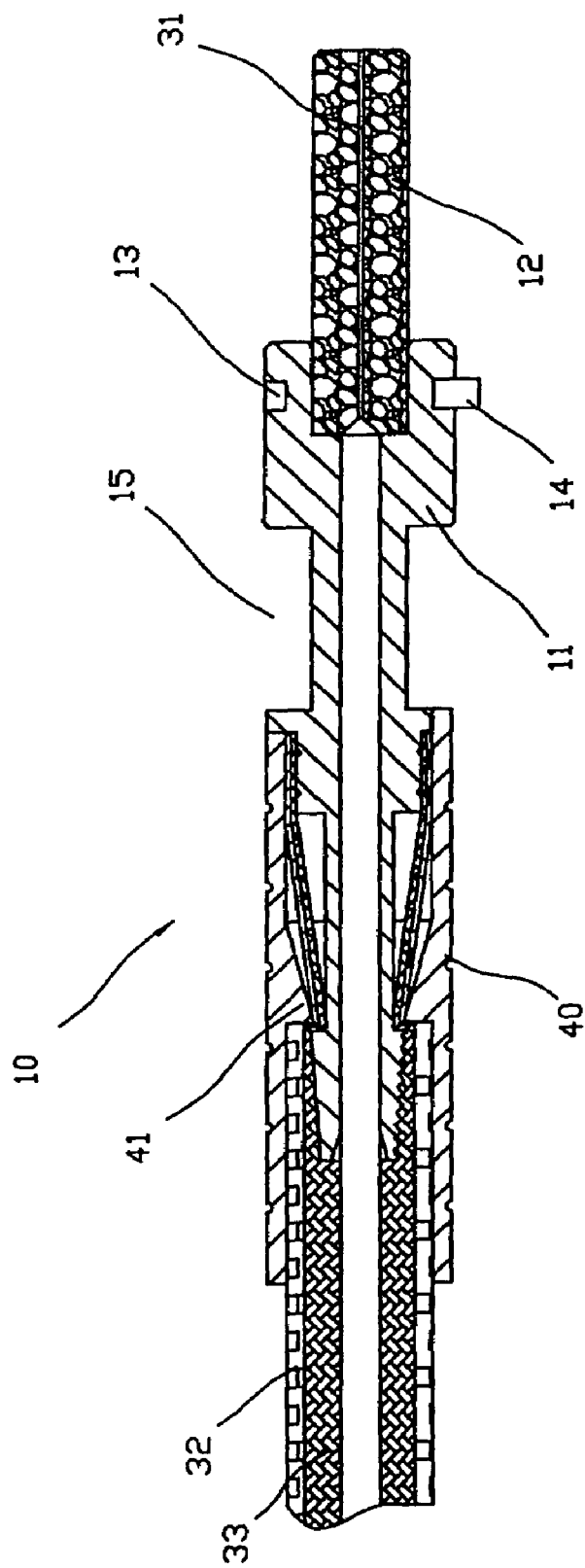
FIG. 4 is a sectional view of a connector of the coupling assembly of FIG. 1.
Figure 5:
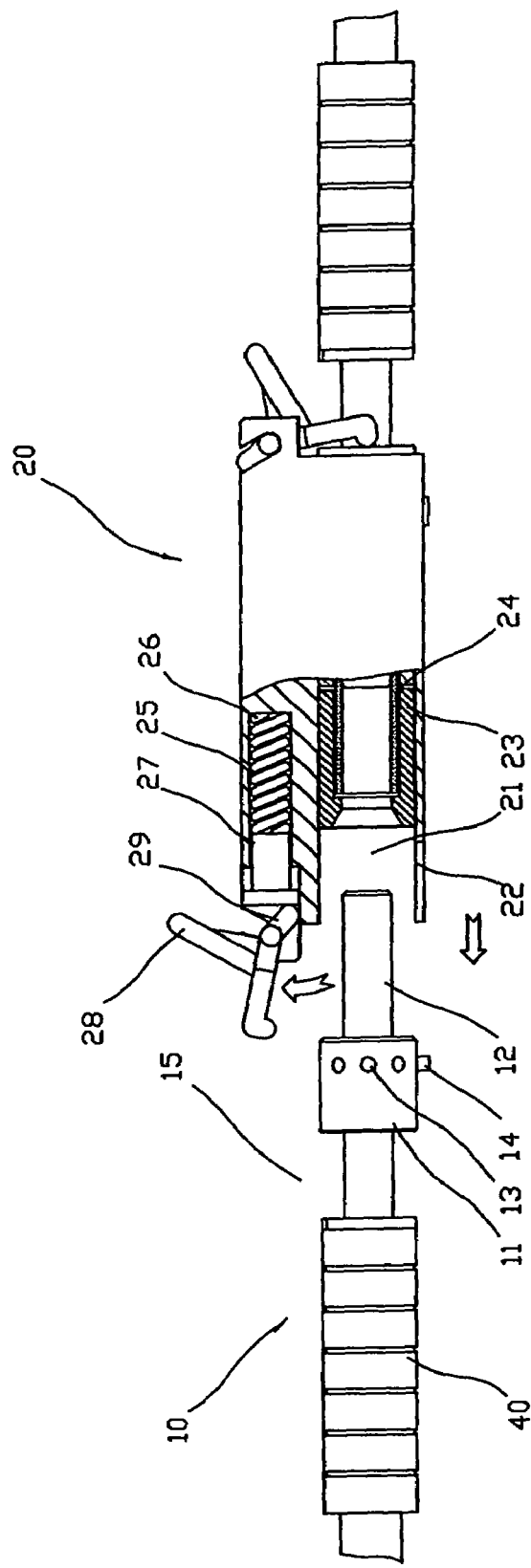
FIG. 5 is a schematic view showing an operation scenario of the coupling assembly of FIG. 1.

As illustrated in FIGS. 1 to 5, an embodiment of the optical fiber coupling assembly according to the present invention is mainly an integration of optical fiber connectors 10 and coupler 20.

A connector 10 mainly contains a hollow, cylindrical crimp ring 40 and a body member 11. A fiber cable 30, having an appropriate length of core 31 extend out the cladding layer 32 and the sheath layer 33, is first sleeved through the crimp ring 40 and then joined to the connector 10's body member 11. The body member 11 has a cone head 16 with an opening (not numbered) to the axial passageway (not numbered) of the body member 11. The extended bare core 31 is threaded through the opening of the cone head 16 and the passageway of the body member 11, while the cone head 16 pierces into the cladding layer 32 and the sheath layer 33 of the fiber cable 30. The crimp ring 40 is then slid to join with the body member 11. Inside the crimp ring 40, there is an inner cone member 41, which allows the cone head 16 to pass through and, after the cone head 16 has passed through, the inner cone member 41 would be stuck against the bottom of the cone head 16, and the fiber cable 30's cladding layer 32 and sheath layer 33 as well. In the mean time, a tenon 42 on an end of the crimp ring 40 is embedded into a groove 17 on a flange (not numbered) of the body member 11. As such, the connector 10 is tightly locked to the fiber cable 30, and the connector 10 cannot be removed from the fiber cable 30 by rotating the crimp ring 40.

The bare fiber core 31 is threaded through the passageway until it is extended out of the tubular plug 12 of the body member 11. The extraneous fiber core 31 outside the tubular plug 12 is cut and removed. The fiber core 31 is then abraded so that its end surface is parallel and aligned with the tubular plug 12's end surface. At this point, the installation of the connector 10 to the fiber cable 30 is completed. Around the cylindrical side surface of the body member 11, there are a number of positioning holes 13. These positioning holes 13 are used later together with a positioning pin 14 to ensure the axes of the fiber cables 30 remain aligned after they are precisely tuned to meet with each other. Compared to the conventional connectors which have springs and other elements inside and, therefore, have higher production cost and assembly difficulty, the advantages of the connectors adopted by the present invention should be quite straightforward to see.

The coupler 20 has at least a pair of connecting holes 21 for receiving the two fiber cable 30 to be joined together. Between the two connecting holes 21, there are two positioning tubes 23 wrapping around sleeves 24. The sleeves 24 are configured such that the tubular plugs 12 of the connectors 10 could fit inside perfectly. At the rim of each connecting hole 21, there is a positioning groove 22 matching the positioning pin 14 of the connector 10 so as to avoid power loss resulted from misalignment and wearing of the fiber cores 31 by the rotation of the connectors 10. Alongside of the connecting holes 21, the coupler 20 also has a pair of pin holes 25. Inside each of the pin holes 25, there is a force delivery mechanism composed of a spring 26 and a pushing pin 27. The pushing pin 27, under a force exerted by the spring 26, is pressed against a latch 28. The latch 28, in turn, forces the connector 10 (along with the fiber cable 30) further into the connecting hole 21. As such, the fiber cores 31 of the two fiber cables 30 are tightly joined together.

To use the coupling assembly of the present embodiment, the connector 10 of a fiber cable 30 is inserted into a connecting hole of the coupler 20 so that the positioning pin 14 is embedded into the positioning groove 22, and the tubular plug 12 fits inside the sleeve 24. The latch 28 is then switched to lock on a ring section 15 in the middle of the body member 11. The body member 11 is thereby pressed forward so that the fiber core 31 would be tightly joined with the other fiber core 31 of another fiber cable 30 inserted from the corresponding connecting hole 21. To unplug a fiber cable 30, the crimp ring 40 is pulled backward and the latch 28 is opened by the body member 11. As described, the present embodiment provides very easy coupling and decoupling of two fiber cables.

Due to the simplified structure of the connectors 10 and the coupler 20, the present embodiment is able to provide another pair of connecting holes for the coupling of another two segments of fiber cables 30 within the same form factor as the conventional couplers. In addition, the tubular plug 12 of the body member 11 has an ordinary diameter and, therefore, requires no special material and less production cost. Furthermore, the reduced number of components and convenience of operation also further contribute to the reduction of production cost and the operation efficiency.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

I claim:

1. An optical fiber coupling assembly comprising at least a connector and a coupler, wherein said connector comprises a crimp ring and a body member, said crimp ring and said body member are fixedly installed to a fiber cable's end by having a cone head of said body member piercing into a cladding layer and a sheath layer of said cable, and a cone member inside said crimp ring is stuck against said cone head of said body member;

said coupler has at least a pair of connecting holes arranged at either side of said coupler respectively, each of said connecting holes wraps a sleeve inside, said coupler has at least a pair of pin holes arranged at either side of said coupler respectively, each of said pin holes contains a spring and a pushing pin inside;

said coupler has a latch configured between a pin hole and an adjacent connecting hole at the same side of said coupler; and said connector is plugged into said sleeve of a connecting hole, said pushing pin and said spring within a corresponding pin hole exert force against a corresponding latch which holds said connector tightly into said connecting hole.

2. The optical fiber coupling assembly according to claim 1, wherein said body member of said connector has a plurality of positioning holes around said body member's surface for the installation of a positioning pin which prevents said body member from rotation after said fiber cable has the core's axis aligned.

* * * * *